United States Patent [19]

Mills

[11] Patent Number: 5,915,225
[45] Date of Patent: Jun. 22, 1999

[54] REMOTELY RETRIEVING SIM STORED DATA OVER A CONNECTION-LESS COMMUNICATIONS LINK

[75] Inventor: James L. Mills, Plano, Tex.

[73] Assignee: Ericsson Inc., Research Triangle Park, N.C.

[21] Appl. No.: 08/623,507

[22] Filed: Mar. 28, 1996

[51] Int. Cl.[6] .............................. H04Q 7/20; H04Q 7/32
[52] U.S. Cl. ..................... 455/558; 455/466; 455/550; 455/412; 455/418; 455/419
[58] Field of Search ..................... 455/558, 466, 455/403, 412, 418, 419, 550, 560, 414, 424, 425

[56] References Cited

U.S. PATENT DOCUMENTS

| | | | |
|---|---|---|---|
| 5,127,040 | 6/1992 | D'Avello et al. | 455/568 |
| 5,297,192 | 3/1994 | Gerszberg | 379/59 |
| 5,351,235 | 9/1994 | Lahtinen | 370/58 |
| 5,353,328 | 10/1994 | Jokimies | 379/58 |
| 5,404,580 | 4/1995 | Simpson et al. | 455/568 |
| 5,455,964 | 10/1995 | Roos et al. | |
| 5,487,180 | 1/1996 | Ohtake . | |
| 5,497,505 | 3/1996 | Koohgoli et al. | |
| 5,633,484 | 5/1997 | Zancho et al. | 455/568 |
| 5,689,547 | 11/1997 | Molne | 455/568 |
| 5,742,910 | 4/1998 | Gallant et al. | 455/558 |

FOREIGN PATENT DOCUMENTS

| | | |
|---|---|---|
| 2152215 | 6/1995 | Canada . |
| 0 562 890 A1 | 3/1993 | European Pat. Off. . |
| 0 555 992 A1 | 4/1993 | European Pat. Off. . |
| 0 644 703 A2 | 4/1994 | European Pat. Off. . |
| 0 641 137 A2 | 8/1994 | European Pat. Off. . |
| 0 679 040 A2 | 4/1995 | European Pat. Off. . |
| 0689368 | 6/1994 | Germany . |
| WO 94/30023 | 12/1994 | WIPO . |
| WO9430023 | 12/1994 | WIPO . |
| WO9620572 | 7/1996 | WIPO . |

Primary Examiner—Wellington Chin
Assistant Examiner—Keith Ferguson
Attorney, Agent, or Firm—Jenkens & Gilchrist, P.C.

[57] ABSTRACT

An SMS or USSD message encapsulating a request for Subscriber Identity Module (SIM) stored data is transported to the mobile station over a connection-less communications link such as a Stand-alone Dedicated Control Channel (SDCCH). An application module within the mobile station having access to the SIM card receives the request signal, retrieves the requesting information from the SIM card, and re-transmits it back to the requesting party. In order to facilitate proper return to the requesting party, if an SMS message is used, a return address is encapsulated into the transmitted SMS message for future reference. The serving mobile switching center (MSC) receives the transmitted message encapsulating the requested subscriber data and routes the received data to the original requesting party.

11 Claims, 6 Drawing Sheets

REMOTELY RETRIEVING SIM STORED DATA OVER A CONNECTION-LESS COMMUNICATIONS LINK

BACKGROUND OF THE INVENTION

1. Technical Field of the Invention

The present invention relates to a mobile telecommunications system and, in particular, to the remote retrieval of subscriber identity module (SIM) stored data via an over-the-air connection-less communications link.

2. Description of Related Art

With the introduction of the Global System for Mobile (GSM) communication and the Personal Communications System (PCS), a number of advanced subscriber features and applications are provided to mobile subscribers. One such feature is a Subscriber Identity Module (SIM) card attachable to a mobile station. Using an SIM card, a mobile subscriber is able to store necessary mobile subscriber information in a detachable memory unit and freely associate it with any available mobile station. Such information includes a mobile subscriber's Mobile Station Integrated Service Digital Network (MSISDN) number (more commonly known as a directory number), or other user specified information, such as preferred speed dialing lists or screening lists. By inserting a mobile subscriber's SIM card into a mobile station, the stored subscriber information in the inserted SIM card is available to the mobile subscriber's new terminal. As a result, the mobile subscriber is able to freely utilize any available mobile station while maintaining the same MSISDN number and subscriber feature data.

Another application is the communication of unstructured data between a mobile station and a serving mobile telecommunications network. Messages like Short Message Service (SMS) messages are utilized to communicate text data between a serving mobile switching center (MSC) and a mobile station. Using SMS messages, the serving MSC can transmit user information to the mobile station and have the mobile station store the received user information in an associated SIM card. SMS messages can then be used to update an SIM card with the latest menu options, speed dial lists, subscriber feature information, etc.

Another example of unstructured data communications comprises the Unstructured Supplementary Service Data (USSD) message. Using USSD messages, a mobile telecommunications network is able to transparently communicate text data with a mobile station. For example, a mobile station can receive and display text messages on an attached display unit and subsequently return a reply message back to the mobile network.

However, even though SMS and USSD messages can be utilized to communicate unstructured data between a mobile telecommunications network and a mobile station, there is currently no mechanism available to remotely request and retrieve SIM stored subscriber data by a mobile telecommunications network via an over-the-air communications link. A mobile network or another user connected to the mobile network has no mechanism to remotely access and retrieve the SIM stored information from the mobile station. As an illustration, even though a mobile subscriber can store his credit card information into his SIM card, whenever the mobile subscriber makes an airline reservation or purchases a product over the phone, the mobile subscriber has to manually and inconveniently enter a long series of credit card numbers to enable the seller to properly credit the subscriber's account.

Accordingly, there is a need to enable the mobile telecommunications network to remotely request and retrieve subscriber data stored in a particular SIM card associated with a mobile station via a connection-less communications link.

SUMMARY OF THE INVENTION

The present invention provides a method and apparatus for remotely requesting and retrieving subscriber information stored in a mobile station via an over-the-air connection-less signal. Particular information is stored in a Subscriber Identity Module (SIM) card attached to a mobile station. A mobile telecommunications network transmits a connection-less signal, such as an Unstructured Supplementary Service Data (USSD) or Short Message Service (SMS) message, requesting such stored information from the mobile station. An application module within the mobile station receives the transmitted connection-less signal, retrieves the requested information from the SIM card, and transmits it back to the requesting mobile network via another connection-less signal. If the requesting connection-less signal is an SMS message, the transmitted SMS message includes a return address to enable the mobile telecommunications network to properly deliver the requested data back to the requesting node. No added return address is needed for a USSD message. However, if the requesting connection-less signal is a USSD message, a separate data coding scheming is utilized to notify the application module within the mobile station that this particular message is requesting stored data from the associated SIM card.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Signaling for telecommunications services is normally performed in a structured way. For example, specific predefined data, formats, and signals names are used to setup a speech connection, to perform handovers, and to authenticate mobile subscriber information when providing telecommunications service to a mobile subscriber. With the introduction of the Global System for Mobile (GSM) communications and the Personal Communications System (PCS), a number of new and advanced supplementary services are being provided to mobile subscribers. Since these supplementary services utilize user specified data, there are no structured ways to communicate these data between a serving Public Land Mobile Network (PLMN) and a mobile station. As a result, a number of unstructured message protocols have been developed for the GSM or PCS environment. One such protocol is the Short Message Service (SMS) protocol for one-way transporting of information between a PLMN and a mobile station. Another protocol is Unstructured Supplementary Service Data (USSD) which has been introduced to enable user interaction between GSM PLMN applications and a mobile station in a transparent way through the mobile telecommunications network. It is transparent because no review or manipulation of the contents of the message is performed during transportation.

Figure 1:
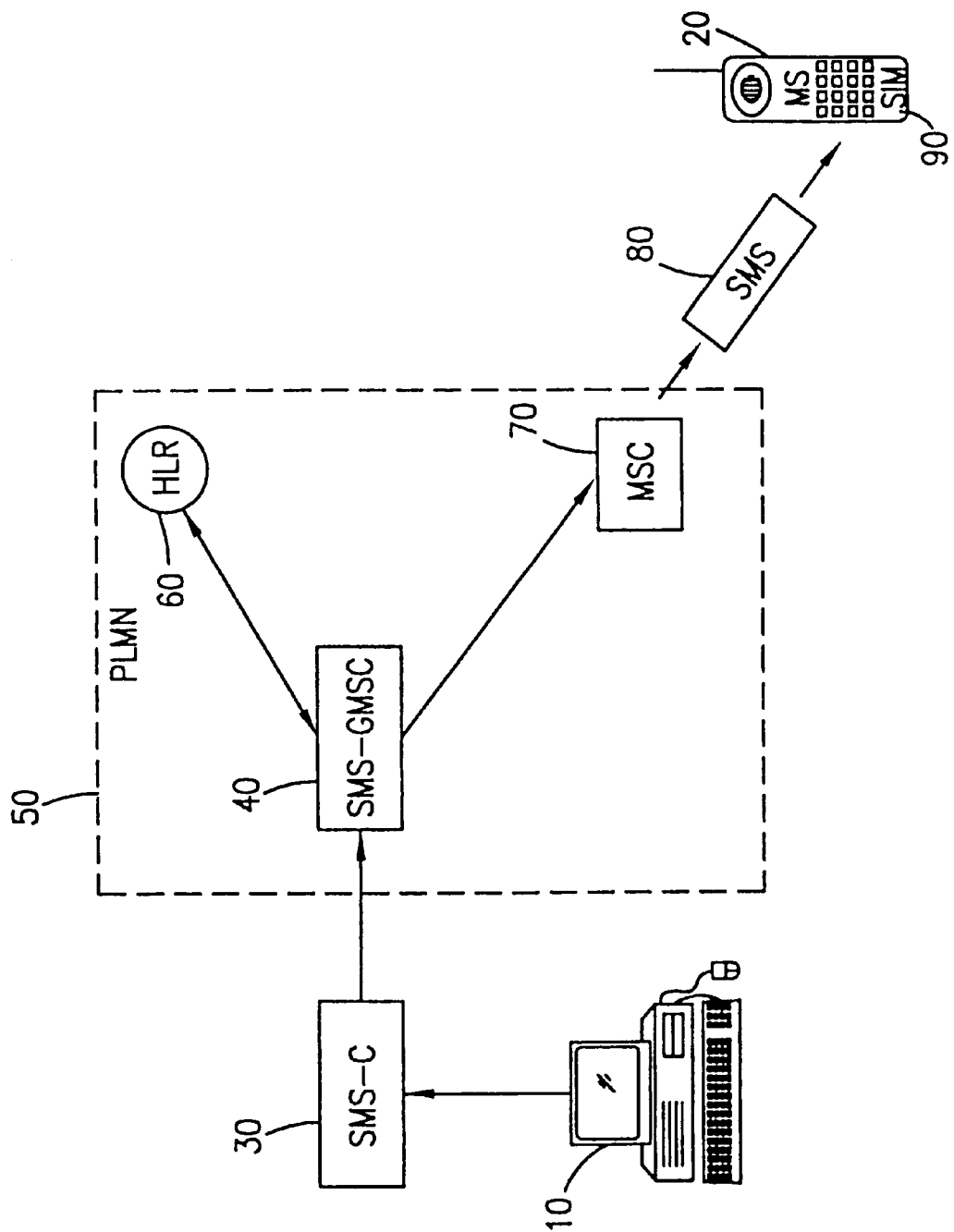
FIG. 1 is a block diagram illustrating the communication of a Short Message Service (SMS) message between an SMS operator and a mobile station.

Reference is now made to FIG. 1 where a block diagram illustrating the communication of a Short Message Service (SMS) message between an SMS operator 10 and a mobile station 20 is shown. The SMS operator 10 sends a string of alphanumeric characters to the Short Message Service Center (SMS-C) 30 to be transmitted to the mobile terminal 20. The SMS-C 30 encapsulates the entered character data into a packet message, such as Signaling System No. 7 (SS7) signals or X.25 protocol packets, and routes the message to a Short Message Service—Gateway Mobile Switching Center (SMS-GMSC) 40 within a PLMN 50 serving the mobile station 20. The SMS-GMSC 40 interrogates a home location register (HLR) 60 associated with the mobile station 20 for routing information (i.e., an identification of where the mobile station 20 is currently located) and subsequently routes the message to a Mobile Switching Center (MSC) 70 serving the mobile station's current location. The mobile station 20 is paged and a connection is set up between the mobile station 20 and the PLMN network 50. If the mobile station 20 is already busy, the connection setup is not performed because the network already knows that the mobile station 20 is accessible. If the connection has been successful, and thereby the mobile station 20 authenticated, the MSC 70 encapsulates the character data into an SMS message 80 and delivers the SMS message 80 to the mobile station 20 over one of the control data channels. A control data channel such as a Stand-alone Dedicated Control Channel (SDCCH) is used instead of a traffic channel (TCH) to allow connection-less data communications. After receiving the SMS message 80 encapsulating the character data, the mobile station 20 acts merely as a buffer and passes the data to the attached Subscriber Identity Module (SIM) card 90. The SIM card 90 then stores the received data into an internal buffer or memory register. Lastly, if the delivery has been successful, a successful delivery report is sent back from the MS 20 to the serving MSC 70, and subsequently from the serving MSC 70 to the SMS-C 30. Otherwise, a failure report is generated.

By utilizing SMS messages and an SIM card, a subscriber feature provider within a telecommunications network can deliver the latest subscriber feature information to the mobile station 20 without requiring the mobile station 20 to be taken in for manual service. For example, whenever the mobile subscriber adds or deletes a new number from his speed dialing subscriber feature, the feature provider can remotely update the mobile station 20 with the mobile subscriber's latest speed dialing lists or options without inconveniencing the mobile subscriber.

Figure 2:
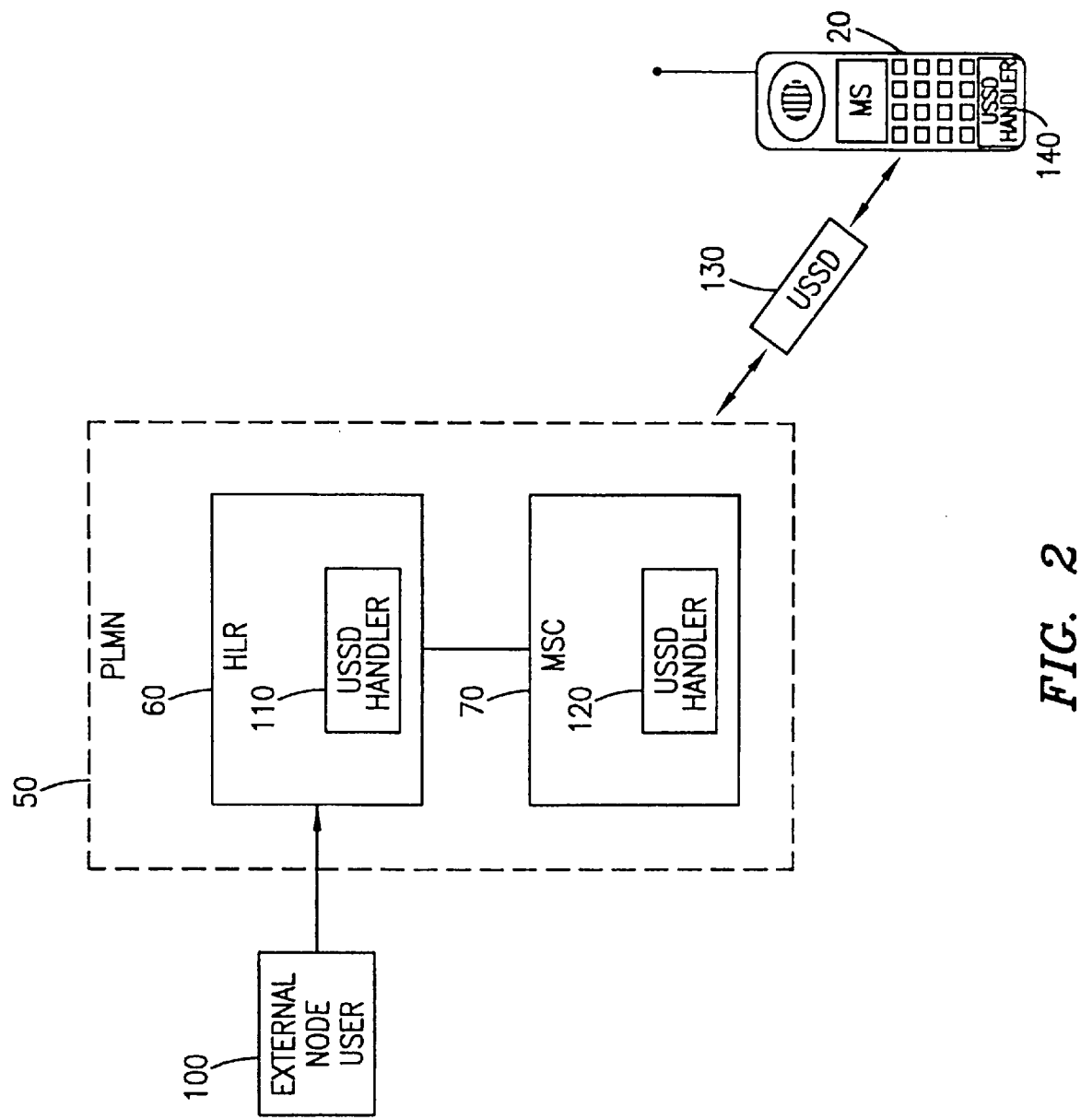
FIG. 2 is a block diagram illustrating the communication of an Unstructured Supplementary Service Data (USSD) message between a USSD external node user and a mobile station.

FIG. 2 is a block diagram illustrating the communication of a USSD message between a USSD external node user 100 and a mobile station 20. USSD messages are utilized by the mobile telecommunications network to transport user defined data to a mobile station 20 or an application module within a mobile station. Therefore, instead of storing the received character data into an SIM card, the received data are either manipulated by the feature application modules within the receiving mobile station 20 to provide special subscriber feature functions or displayed on a display unit for user interaction. Therefore, two parties within a mobile telecommunications network can utilize USSD messages to communicate text messages back and forth without establishing a speech connection.

The external node user 100 transmits a USSD message encapsulating the character data to the HLR 60 within the serving PLMN 50. The HLR 60 is associated with a number of different MSCs within the same PLMN 50. As the mobile station 20 travels from one MSC area to another, the HLR 60 receives location update signals and keeps record of the mobile station's current location. Whenever a USSD signal is received by the HLR 60, the HLR 60 ascertains the current location of the mobile station 20. The USSD handler 110 within the HLR 60 thereafter transparently forwards the USSD signal to the appropriate MSC 70 currently serving the mobile station 20. The USSD handler 120 within the serving MSC 70 receives the transmitted message and transports the USSD message 130 to the mobile station 20 over a connection-less communications link. The USSD handler 140 within the mobile station 20 then receives the transmitted USSD message 130, extracts the encapsulated character data, and forwards the extracted data to the appropriate application module. One example of such an application module is a user interface module for displaying the received character data onto a display unit attached to the mobile station 20.

Even though unstructured data, such as user defined character data, can be transported to the mobile station and either displayed or manipulated by an application module, there is currently no mechanism available to remotely request and retrieve already stored data from an SIM card. As described in FIG. 3, SMS messages can be transmitted to update the contents of an SIM card. But, because SMS messages are designed for unilateral communications between a serving mobile network and an associated mobile station, there is currently no mechanism to read or retrieve previously stored subscriber data from an SIM card and to route the retrieved data back to the requesting party. USSD messages, on the other hand, are bilateral communications messages where messages can be transmitted back and forth between two nodes or parties within a mobile telecommunications system. As further illustrated in FIG. 2, two parties can communicate text messages back and forth using USSD messages without establishing a voice connection over a TCH. However, because USSD messages were designed as application layer messages intended for mobile subscriber utilization, there is currently no mechanism available to route the received USSD message to an SIM card application.

With the increased memory capacity of an SIM card, mobile subscribers are able to store more and more frequently used subscriber information. An illustration of such information is a mobile subscriber's credit card information. Currently, whenever the mobile subscriber purchases a product or service over-the-phone, the mobile subscriber has to either verbally provide the other party with his long series of credit card numbers or manually enter the numbers using an alphanumeric key pad. Use of the verbal method inconveniently requires both parties to verbally verify and reconfirm the number repeatedly and further allows disclosing of the information to a possible eaves-dropper. Similarly, the manual dialing is also inconvenient and error-prone especially when the mobile subscriber has to tediously enter a long series of numbers while talking on the phone. Accordingly, it would be advantageous to enable the mobile telecommunications network to request and retrieve the desired subscriber information stored in an SIM card via over-the-air connection-less signals. A mobile subscriber can store frequently used information such as his credit card information in his SIM card. Upon purchase of a product or service, it would be advantageous for the mobile telecommunications network to enable the seller to automatically and accurately request and retrieve the stored information from the mobile subscriber's SIM card.

Figure 3:
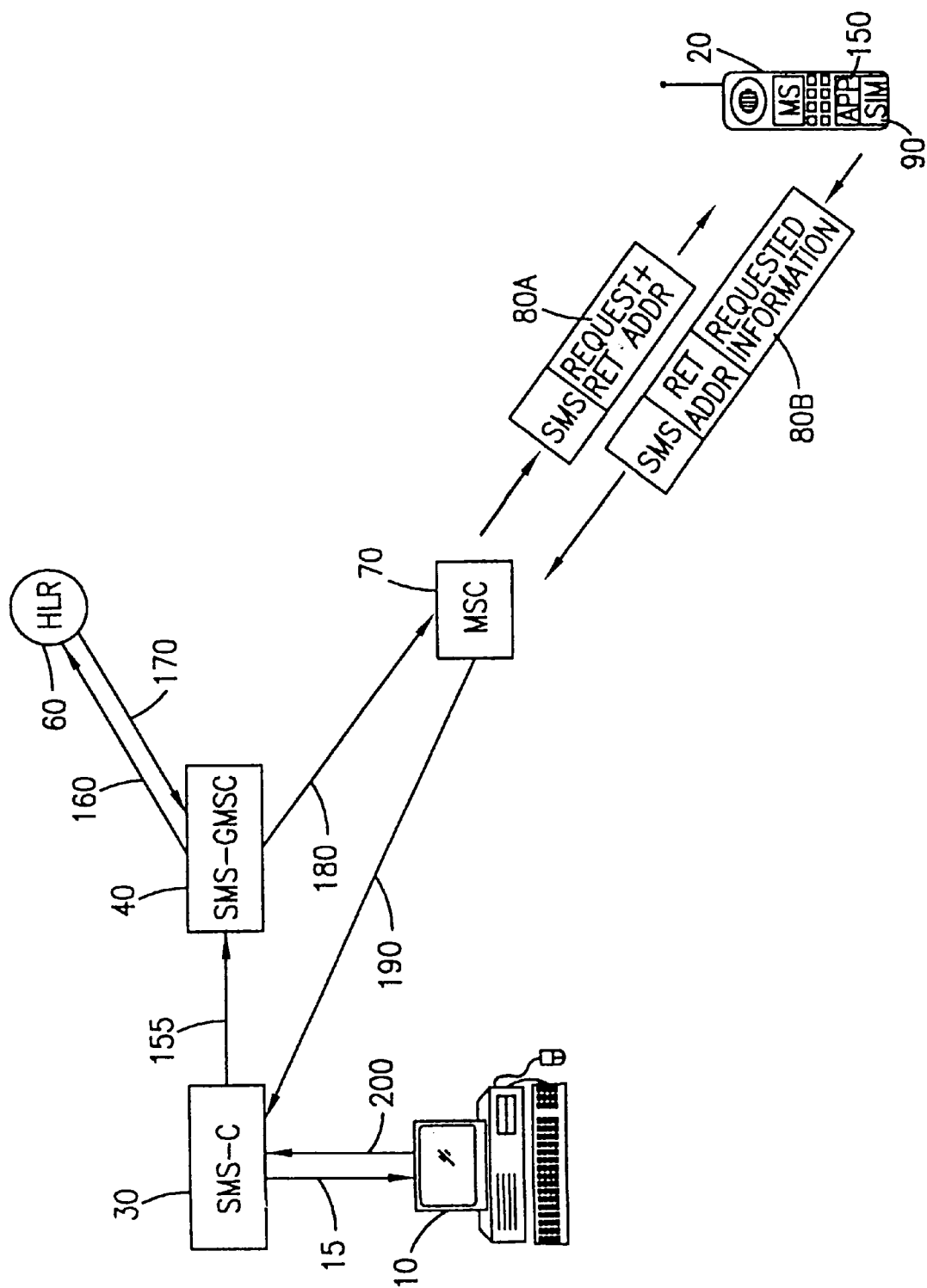
FIG. 3 is a block diagram illustrating the remote retrieval of mobile station stored subscriber data using SMS messages in accordance with the teachings of the present invention.
Figure 4:
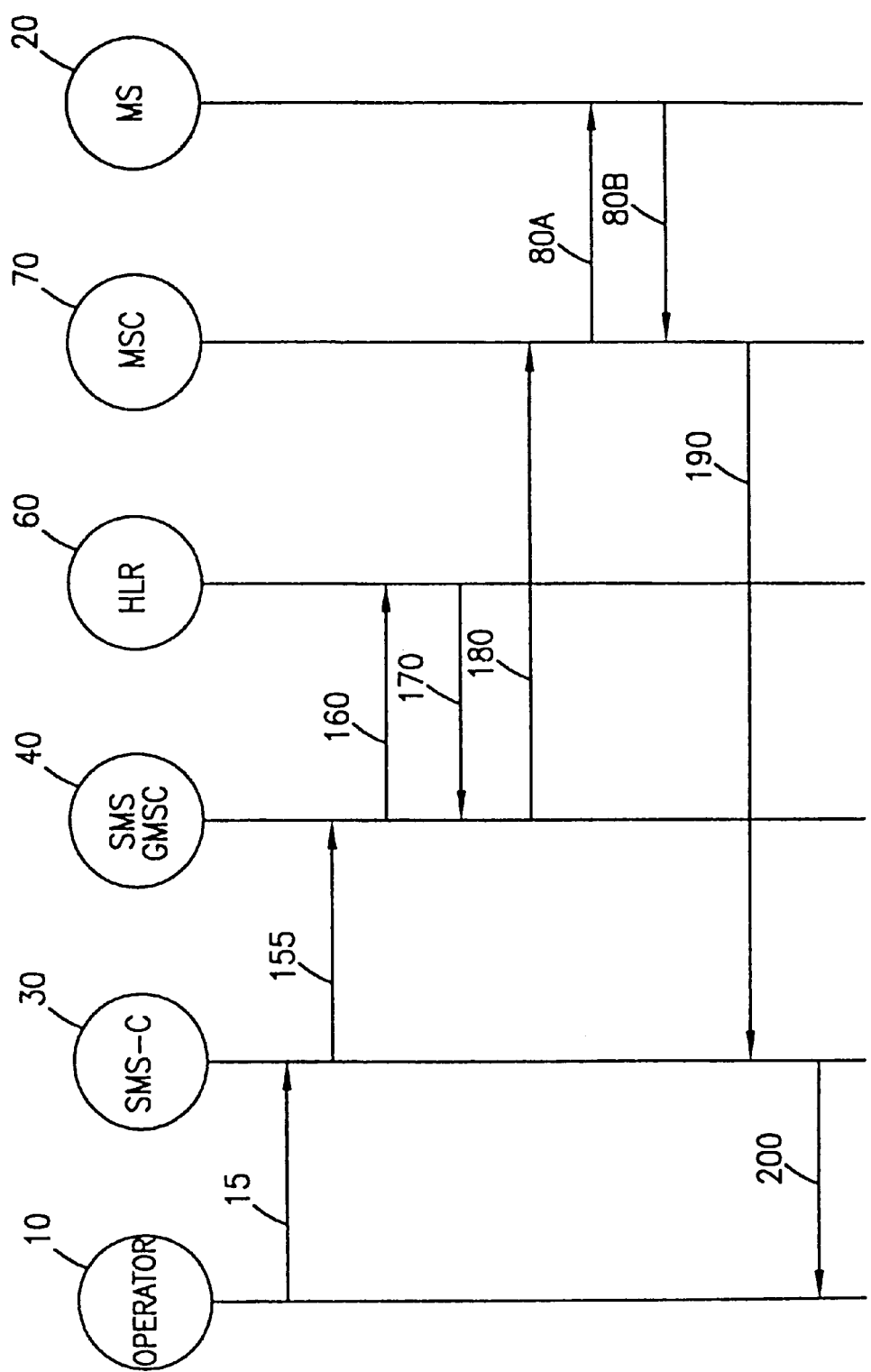
FIG. 4 is a signal sequence diagram illustrating the communication of signals for remotely retrieving mobile station stored subscriber data using SMS messages.

Now reference is made to both FIGS. 3 and 4 where a block diagram and a signal sequence diagram, respectively, illustrating the communication of signals for remotely retrieving SIM stored data using SMS messages are shown in accordance with the teachings of the present invention. The SMS operator 10, such as an airline agent, transmits a request signal 15 containing subscriber data request such as subscriber credit card information to the SMS-C 30. The SMS-C 30 routes the request signal 155 to the appropriate SMS-GMSC 40 serving that particular mobile station 20. The SMS-GMSC 40 interrogates the HLR 60 associated with the mobile station 20 for routing information (signal 160) and receives the appropriate MSC address from the HLR 60 (signal 170). The SMS-GMSC 40, consequently, transmits the request signal 180 requesting particular SIM stored subscriber data to the serving MSC 70. The serving MSC 70 receives the transmitted request signal from the SMS-GSMC 40 and accordingly transmits an SMS message 80a encapsulating the request to the mobile station 20 over a connection-less communications link such as a SDCCH. In order to properly facilitate the delivery of the requested information back to the original node, the SMS message 80a further contains a return address representing the network address of the SMS operator 10. The return address is needed because SMS messages are unilateral messages where communications links are established one way at a time.

An application module 150 within the mobile station 20 receives the SMS message 80a, extracts the subscriber credit card information request, and retrieves the requested information from the SIM card 90. The retrieved data are then encapsulated and transmitted back to the serving MSC 70 via another SMS message 80b. The return SMS message 80b utilizes the previously received return address to properly locate the requesting node. The serving MSC 70 receives the transmitted SMS message 80b and routes it to the SMS-C 30 (signal 190). There is no reason for the serving MSC 70 to reroute the SMS message 80b back to the SMS-GMSC 40 because, by analyzing the return address, the serving MSC 70 is able to determine the network location of the SMS-C 30 directly without going through a gateway. The SMS-C 30 lastly routes the received message carrying the requested subscriber credit card information to the original SMS operator 10 (signal 200).

Figure 5:
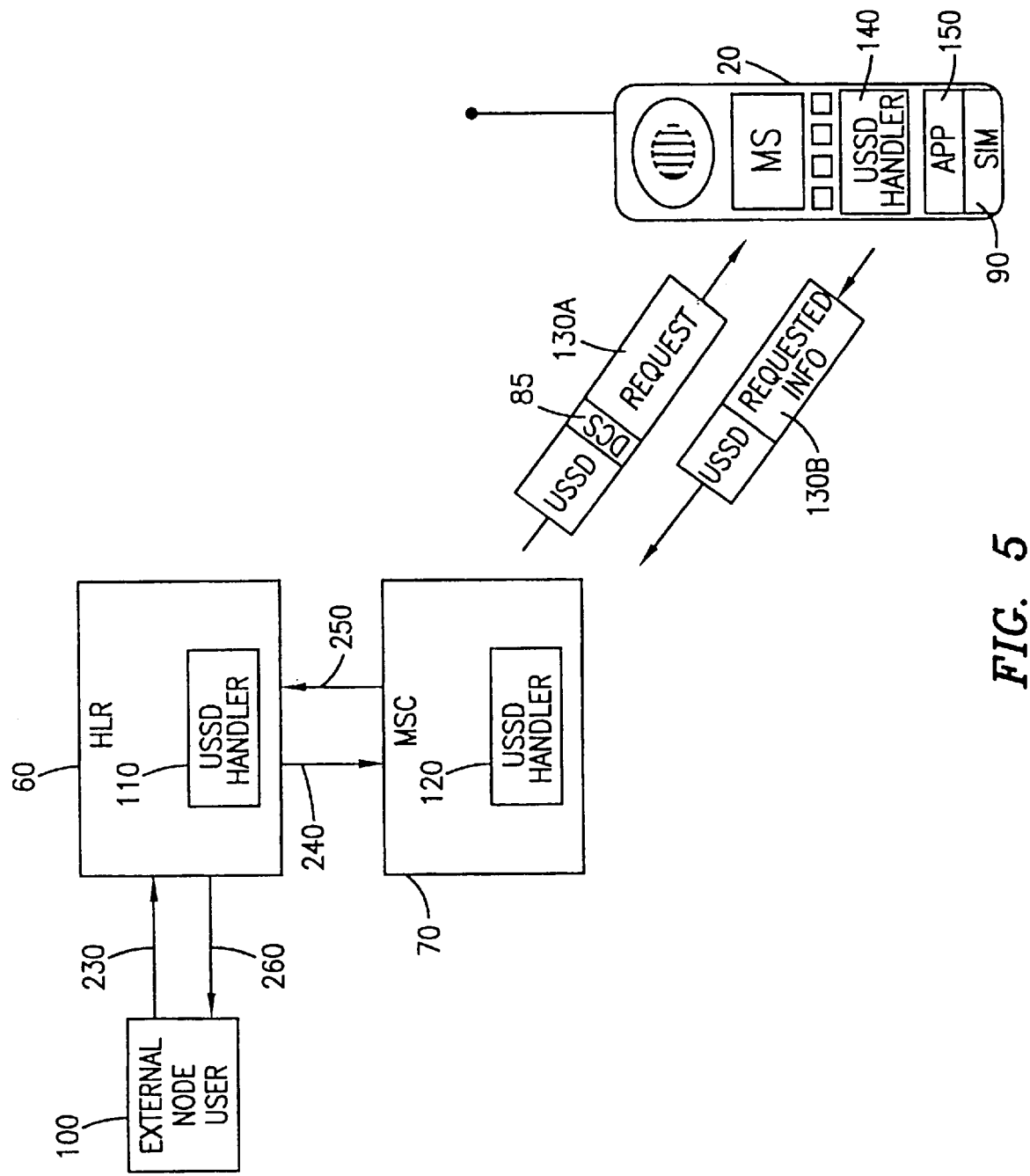
FIG. 5 is a block diagram illustrating the remote retrieval of mobile station stored subscriber data using USSD messages.
Figure 6:
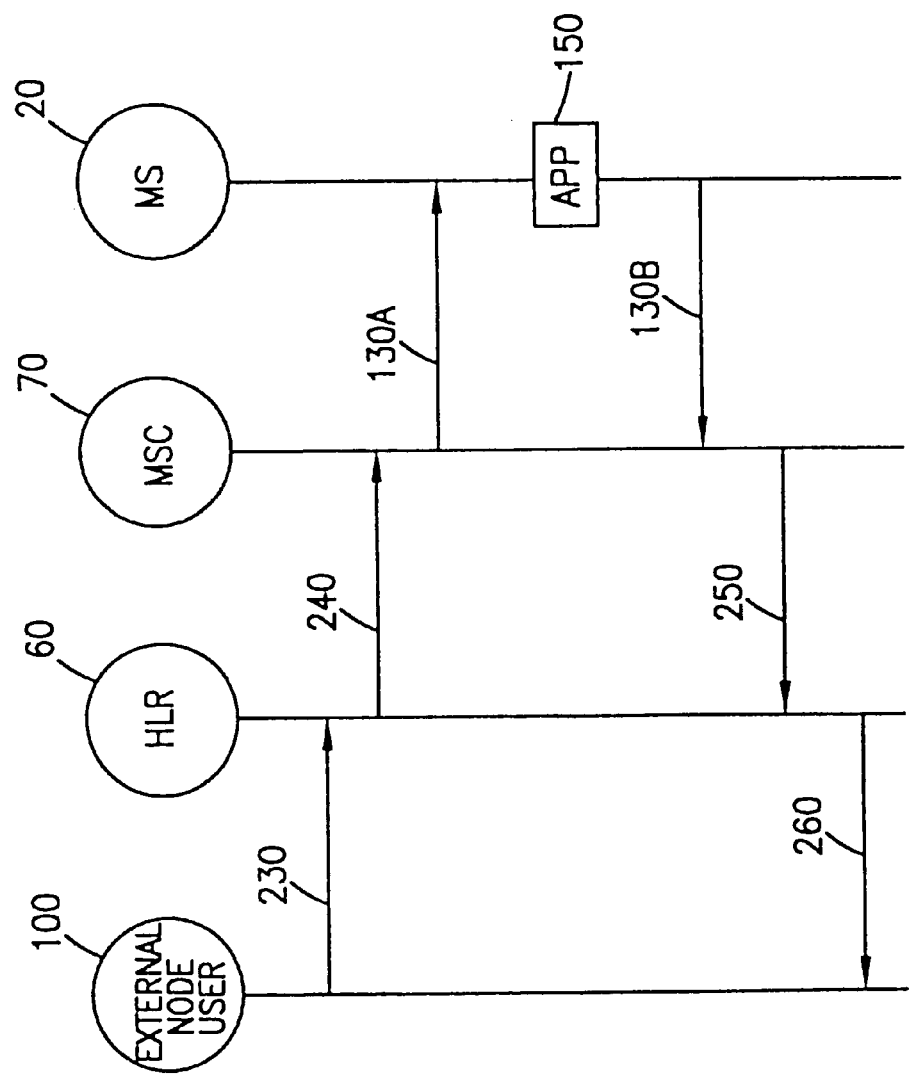
FIG. 6 is a signal sequence diagram illustrating the communication of signals for remotely retrieving mobile station stored subscriber data using USSD messages.

As another embodiment of the present invention, FIGS. 5 and 6 are a block diagram and a signal sequence diagram, respectively, illustrating the remote retrieval of SIM stored subscriber data using USSD messages. The external node user 100, such as an airline agent, transmits a signal 230 requesting SIM stored data such as subscriber credit card information to the HLR 60 serving the mobile station 20.

The HLR 60 receives the request signal and determines which MSC is currently serving the mobile station 20. In response to such a determination, the USSD handler 110 within the HLR 60 transparently routes the request signal 240 to the appropriate MSC 70. The USSD handler 120 within the serving MSC 70 then receives the request signal, locates the mobile station 20, and transports a USSD message 130a encapsulating the request to the mobile station 20 over a connection-less communications link such as a SDCCH. The data coding scheme (DCS) field 85 for the USSD message 130a is specified with the numerical value of two (2) to inform the mobile station 20 that this particular USSD message 130a is intended for the SIM card 90 instead of the mobile subscriber. The USSD handler 140 within the mobile station 20 receives the transmitted USSD message 130a and extracts the request for SIM stored data. By evaluating the DCS value specified by the received USSD Message 130a, the mobile station forwards the extracted request to the application module 150 associated with the SIM card 90. The application module 150 having access to the SIM card 90 retrieves the requested data by reading the appropriate SIM memory location. The retrieved data are then encapsulated and transmitted back to the serving MSC 70 using another USSD message 130b. Because USSD messages are designed to be used as a bilateral communications protocol, no separate return address needs to be included as data in the request message 130a. The USSD handler 120 within the serving MSC 70 again receives the transmitted USSD message 130b from the mobile station 20 and determines that the message needs to be forwarded to the HLR 60 (signal 250). The USSD handler 110 within the HLR 60, in turn, receives the transmitted USSD message 130b and further determines that the message is intended for the external node user 100. The message encapsulating the requested subscriber information is accordingly rerouted to the external node user 100. As a result, original requesting party has remotely and accurately acquired the SIM stored subscriber information from the mobile station 20 without inconveniencing the mobile subscriber.

As a precaution, if the mobile subscriber wishes to prevent illegal access to his SIM card via SMS or USSD messages, a password can be placed with the application module 150. When another party within the telecommunications network requests SIM stored data via a connection-less communications link, the approved password must be included in the data section of the request message in order to access the SIM card. The application module 150 evaluates the received password with the internally stored password and only allows access to the stored data if there is a match.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for remotely retrieving subscriber data from a Subscriber Identity Module card attached to a mobile station, said system comprising:

a mobile switching center for transmitting a first Unstructured Supplementary Service Data message to the mobile station, said first Unstructured Supplementary Service Data message including:

a request for said subscriber data; and a data code field for informing said mobile station that the first Unstructured Supplementary Service Data message is intended for the Subscriber Identity Module card; and said mobile station, responsive to the first Unstructured Supplementary Service Data message, for retrieving the requested subscriber data from the Subscriber Identity Module card and for transmitting a second Unstructured Supplementary Service Data message containing said retrieved subscriber data to the mobile switch center.

2. The system of claim 1, wherein the mobile station further includes a Unstructured Supplementary Service Data handler for receiving the first Unstructured Supplementary Service Data message and extracting the request.

3. The system of claim 2, wherein the Unstructured Supplementary Service Data handler further includes means for encapsulating and transmitting the second Unstructured Supplementary Service Data message.

4. The system of claim 1, wherein the data code field further includes a data coding scheme field having a predetermined value.

5. The system of claim 1, wherein the mobile station further includes an application module, responsive to the extracted request, for retrieving the requested subscriber data.

6. The system of claim 5, wherein the application module includes a password means for allowing access to the Subscriber Identity Module card upon determining a match exists between a received password and a stored password.

7. A mobile station used in a mobile telecommunications system, said mobile station comprising:

a Subscriber Identity Module card for storing subscriber data;

an application module coupled to the Subscriber Identity Module card;

an Unstructured Supplementary Service Data handler coupled to the application module for extracting a request for a portion of the stored subscriber data from a first Unstructured Supplementary Service Data message, said first message having a data coding scheme field for informing said mobile station that the first message is intended for the Subscriber Identity Module card; and said application module, responsive to the extracted request, for retrieving the portion of the stored subscriber data from the Subscriber Identity Module and for encapsulating and transmitting a second Unstructured Supplementary Service Data message containing the retrieved portion of the subscriber data.

8. The mobile station of claim 7, wherein the application module further includes a password means for allowing access to the Subscriber Identity Module card upon determining a match exists between a received password and a stored password.

9. A method used in a mobile telecommunications system for remotely retrieving subscriber data from a Subscriber Identity Module card attached to a mobile station, said method comprising the steps of:

transmitting from a mobile switching center to the mobile station a first Unstructured Supplementary Service Data message having a request for said subscriber data;

extracting the request from the first message;

informing said mobile station that the first message is intended for the Subscriber Identity Module card;

retrieving the requested subscriber data from the Subscriber Identity Module card; and transmitting a second Unstructured Supplementary Service Data message containing said retrieved subscriber data to the mobile switch center.

10. The method of claim 9, wherein the step of transmitting a second message further includes the step of encapsulating the second message.

11. The method of claim 9, wherein the step of retrieving further includes the step of allowing access to the Subscriber Identity Module card upon determining a match exists between a received password and a stored password.

* * * * *